J. GINTHER.
Horse Hay-Rake.
No. 79,065. Patented June 23, 1868.
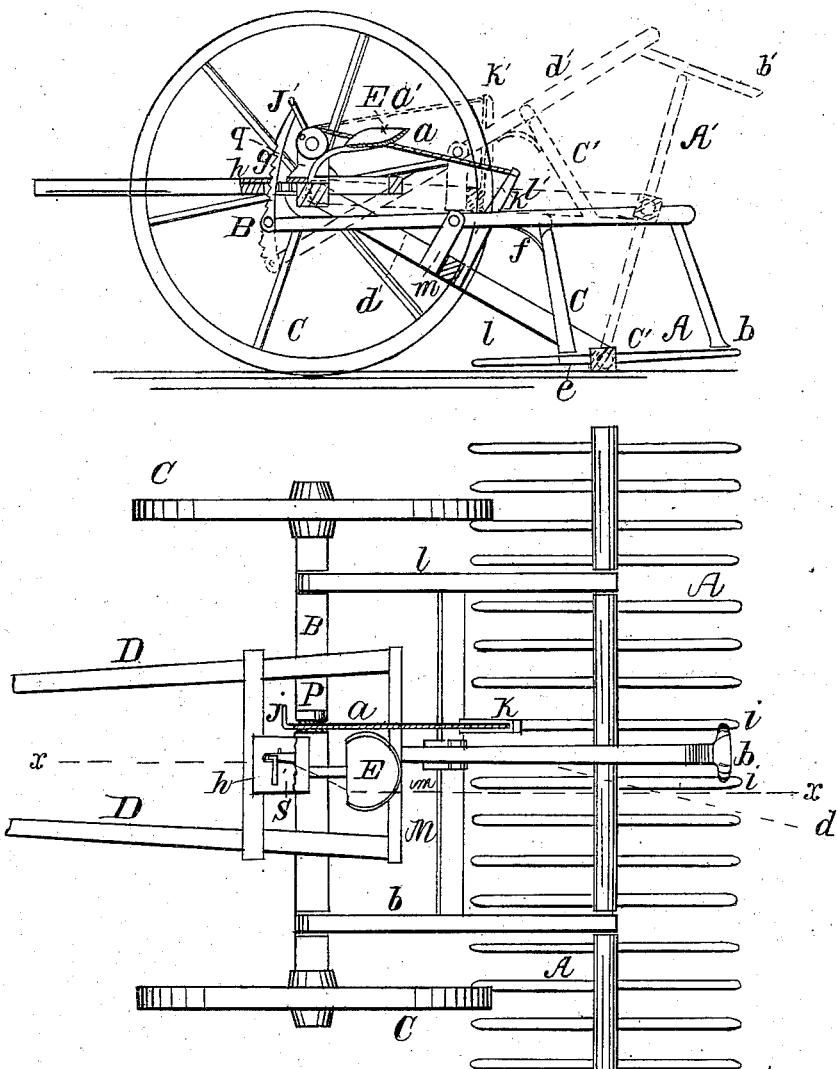

UNITED STATES PATENT OFFICE.

JACOB GINTHER, OF MIER, ILLINOIS.

IMPROVEMENT IN HORSE-RAKES.

Specification forming part of Letters Patent No. 79,065, dated June 23, 1868.

*To all whom it may concern:*

Be it known that I, JACOB GINTHER, of Mier, in the county of Wabash and State of Illinois, have invented a new and useful Improvement in Horse-Rakes; and I do hereby declare that the following is a full, clear, and exact description thereof, which will enable others skilled in the art to make and use the same, reference being had to the accompanying drawings, forming part of this specification, in which—

Figure 1 is a section view of my invention, taken through the line $x\ x$ of Fig. 2. Fig. 2 is a plan view of the invention.

Similar letters of reference indicate like parts.

The object of this invention is to provide a horse-rake which will operate more satisfactorily than those of similar construction heretofore made.

The invention consists in the mechanism for revolving the rake proper, and the said mechanism is duly set forth in the following.

In the accompanying drawings, the rake A is connected with the axle B by rods $l\ l$, of the usual construction, which permit the raising of the rake-shaft and the revolution of the same.

The trip-stick $d$ is pivoted to the upright $m$, which latter is affixed in any suitable manner to the cross-brace $n$, uniting the rods $l\ l$.

The rake is in the rear of the wheels $c\ c$, and is revolved by lifting the rake, so that the front points of its teeth, being pressed down by the weight of the hay collected therein, will encounter the ground, and accomplish the revolution of the rake as the same moves forward, in the manner common to all revolving rakes.

The lifting of the rake for this object is accomplished by means of a device consisting of the cord $a$, which is affixed to a wheel, $o$, and also to an upright, $k$, rising from the cross-brace $n$.

A lever-handle, $j$, is affixed to the wheel $o$, by which it is conveniently operated by the driver seated upon the seat E, who, when the rake has gathered a sufficient quantity of hay, pushes the handle forward, which action partially revolves the wheel $o$, winding the cord $a$ thereon, and consequently lifting the rake, as before mentioned.

Before lifting the rake, however, the trip-stick $d$ must be pushed down to raise the foot $b$, affixed thereto, from the two central teeth $i\ i$, upon which it rests, to keep the rake from revolving until a sufficient quantity of hay is collected.

When the trip-stick is depressed the foot $b$ is raised, so that the rake-teeth $i\ i$ will have room to pass clear of the said foot as the rake revolves.

The trip-stick is provided with a pivoted stop-rod, $e$, the lower end of which is in contact with the short stop-tooth $c$ when the rake is gathering up the hay.

The stop-rod is pivoted to the trip-stick, as shown, and rises with it, and is provided with a curved spring-brace, $f$, which permits it to yield, when encountered by the opposite stop-tooth $c'$, as the rake makes one half-revolution.

The stop-rod yields as the stop-tooth encounters it, and permits the passage of the latter, as the said rod is not raised high enough by the trip-stick to do so without this device.

The end of the trip-stick is provided with an arched ratchet-rack, $g$, the teeth of which catch against the edges of the hole in the plate $h$, through which the said rack works, whereby the rake may be held raised while the rake is being drawn to and from the meadow.

The shafts D D are affixed to the axle B in any suitable manner, as that shown.

The raised position of the rake and trip-stick is shown in Fig. 1, and the same parts are indicated by the same letters with a prime-mark added.

A spring, $r$, serves to keep the ratchet-rack in contact with the plate $h$.

The ratchet-rack is provided with a handle, $s$, as shown.

Having thus described my invention, I claim as new and desire to secure by Letters Patent—

1. The described arrangement of the trip-stick $d$, having a ratchet-handle, $g$, foot $b$, pivoted stop-rod $e$, and spring-brace $f$, with relation to the hinged bars $l$, carrying the rake A, said bars $l$ being adapted to be elevated and lowered by means of the cord $a$, drum $o$, and lever $j$, all as and for the purposes herein shown and specified.

2. The combination of the ratchet-rack and trip-stick, substantially as described.

JACOB GINTHER.

Witnesses:
 WM. FRIEND,
 GEORGE L. BAILEY.